(12) United States Patent
Byun et al.

(10) Patent No.: US 8,467,802 B2
(45) Date of Patent: Jun. 18, 2013

(54) MOBILE TELECOMMUNICATION SYSTEM AND JOINT RESOURCE ALLOCATION METHOD FOR MULTIPLE STATION JOINT RESOURCE ALLOCATION AND JOINT GROUP HANDOVER

(75) Inventors: Hee Jung Byun, Suwon-si (KR); Mi-Sun Do, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 987 days.

(21) Appl. No.: 12/186,790

(22) Filed: Aug. 6, 2008

(65) Prior Publication Data

US 2009/0181694 A1    Jul. 16, 2009

(30) Foreign Application Priority Data

Jan. 14, 2008  (KR) .................. 10-2008-0004140

(51) Int. Cl.
*H04W 72/00* (2009.01)
*H04M 11/00* (2006.01)

(52) U.S. Cl.
USPC .......................................... 455/453; 455/406

(58) Field of Classification Search
USPC .................. 370/328–329, 315, 331; 455/453, 455/436–442, 450–451, 452.1, 452.2, 422.1, 455/15–16, 406
See application file for complete search history.

(56) References Cited

U.S. PATENT DOCUMENTS

| | | | |
|---|---|---|---|
| 5,241,686 A * | 8/1993 | Charbonnier | 455/453 |
| 5,722,072 A | 2/1998 | Crichton et al. | |
| 5,722,073 A | 2/1998 | Wallstedt et al. | |
| 5,825,759 A | 10/1998 | Liu | |
| 6,130,881 A * | 10/2000 | Stiller et al. | 370/238 |
| 6,434,380 B1 * | 8/2002 | Andersson et al. | 455/406 |
| 6,526,039 B1 | 2/2003 | Dahlman et al. | |
| 7,751,367 B2 * | 7/2010 | Gaal et al. | 370/332 |
| 2004/0125768 A1 | 7/2004 | Yoon et al. | |
| 2006/0166677 A1 * | 7/2006 | Derakshan et al. | 455/453 |
| 2006/0280116 A1 * | 12/2006 | Ji et al. | 370/210 |
| 2006/0293060 A1 * | 12/2006 | Yang et al. | 455/453 |
| 2007/0253355 A1 * | 11/2007 | Hande et al. | 370/328 |
| 2008/0043668 A1 * | 2/2008 | Chen et al. | 370/329 |
| 2008/0070510 A1 * | 3/2008 | Doppler et al. | 455/69 |
| 2008/0070582 A1 * | 3/2008 | Cai | 455/450 |
| 2008/0117877 A1 * | 5/2008 | Min et al. | 370/331 |
| 2008/0130550 A1 * | 6/2008 | Kim et al. | 370/315 |
| 2008/0181176 A1 * | 7/2008 | Lee et al. | 370/331 |
| 2008/0188231 A1 * | 8/2008 | Zhu et al. | 455/450 |
| 2008/0242301 A1 * | 10/2008 | Osterling et al. | 455/436 |
| 2008/0285499 A1 * | 11/2008 | Zhang et al. | 370/315 |
| 2009/0088165 A1 * | 4/2009 | Shen et al. | 455/436 |
| 2009/0163223 A1 * | 6/2009 | Casey | 455/453 |

FOREIGN PATENT DOCUMENTS

| | | |
|---|---|---|
| JP | 2007-043332 | 2/2007 |
| KR | 2006-86316 | 7/2006 |
| KR | 10-716447 | 5/2007 |

* cited by examiner

*Primary Examiner* — Brandon Miller
(74) *Attorney, Agent, or Firm* — NSIP Law

(57) ABSTRACT

A mobile telecommunication and joint resource allocation of a multiple-station and joint group handover. The mobile telecommunication system comprises a utility function processing unit to process a utility function that is a load factor of each cell, a critical set determining unit to determine a critical set based on the utility function, and a resource allocation processing unit to allocate a resource in association with another at least one mobile telecommunication system corresponding to the critical set.

21 Claims, 9 Drawing Sheets

MOBILE TELECOMMUNICATION SYSTEM AND JOINT RESOURCE ALLOCATION METHOD FOR MULTIPLE STATION JOINT RESOURCE ALLOCATION AND JOINT GROUP HANDOVER

CROSS-REFERENCE TO RELATED APPLICATION

This application claims the benefit of a Korean Patent Application No. 2008-4140, filed in the Korean Intellectual Property Office on Jan. 14, 2008, the disclosure of which is incorporated herein by reference.

BACKGROUND OF THE INVENTION

1. Field of the Invention

Aspects of the invention relate to a mobile telecommunication and joint resource allocation method for joint resource allocation of a multiple-station and joint group handover.

2. Description of the Related Art

A single-connection system is either a system using a resource from a single cell or a system having single-connection to a single superordinate station, the system's own access station, or a neighbor base station.

A relay system of a conventional single-connection system obtains a resource allocated from a single superordinate station. However, when a resource allocated from a superordinate station is insufficient due to an increased traffic load of the superordinate station, a relay station performs handover to another superordinate station having a relatively lower traffic load, thereby changing the relay system's topology. If the other superordinate station also has difficulty in handling the traffic load due to a lack of resources, reconfiguration of a topology of the relay fails.

SUMMARY OF THE INVENTION

Aspects of the invention provide a mobile telecommunication system and a joint resource allocation method to perform radio resource management, QoS-aware multi-session management, handover success rate improvement, and call blocking rate reduction in a mobile telecommunication system including a multiple-connection function by determining a critical mode and a critical set for distributing a load and by allocating joint resource for each element station.

Additional aspects of the invention provide a mobile telecommunication system and joint resource allocation method for reducing regional collisions and a phenomenon of asymmetric loads between cells, by selecting multiple cells based on a traffic load of each cell and performing joint resource allocation and joint group handover.

According to an aspect of the invention, a mobile telecommunication system is provided. The mobile telecommunication system comprises a utility function processing unit to process a utility function that is a load factor of each cell, a critical set determining unit to determine a critical set based on the utility function, and a resource allocation processing unit to allocate a resource in association with another at least one mobile telecommunication system corresponding to the critical set.

According to another aspect of the invention, the utility function includes either a total demand to total capacity ratio of a cell or a total power to maximum power ratio of a cell.

According to another aspect of the invention, the utility function processing unit includes a utility function estimating unit to estimate a utility function of a corresponding cell, a utility function notification unit to notify a neighbor cell of the estimated utility function, and a utility function receiving unit to receive a utility function of the neighbor cell.

According to another aspect of the invention, the critical set determining unit may include a utility function aligning unit to align the utility function, a selecting unit to select another at least one mobile telecommunication system corresponding to a predetermined utility function when a utility function of a corresponding cell is the same as the maximum value of the aligned utility function; and a feasibility determining unit to determine whether a feasibility of the other at least one mobile telecommunication system exists.

According to another aspect of the invention, the mobile telecommunication system includes a utility price receiving unit to receives a utility price from the other at least one mobile telecommunication system, a feasibility determining unit to determine whether feasibility of a corresponding multiple-connection system exists based on the utility price, and an acceptance message transmitting unit to transmit an acceptance message to the other at least one mobile telecommunication system when the feasibility determining unit determines that feasibility exists.

According to another aspect of the invention, a method of joint resource allocation is provided. The method comprises processing a utility function that is a load factor of each cell, determining a critical set based on the utility function; and allocating a resource in association with another at least one mobile telecommunication system corresponding to the critical set.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
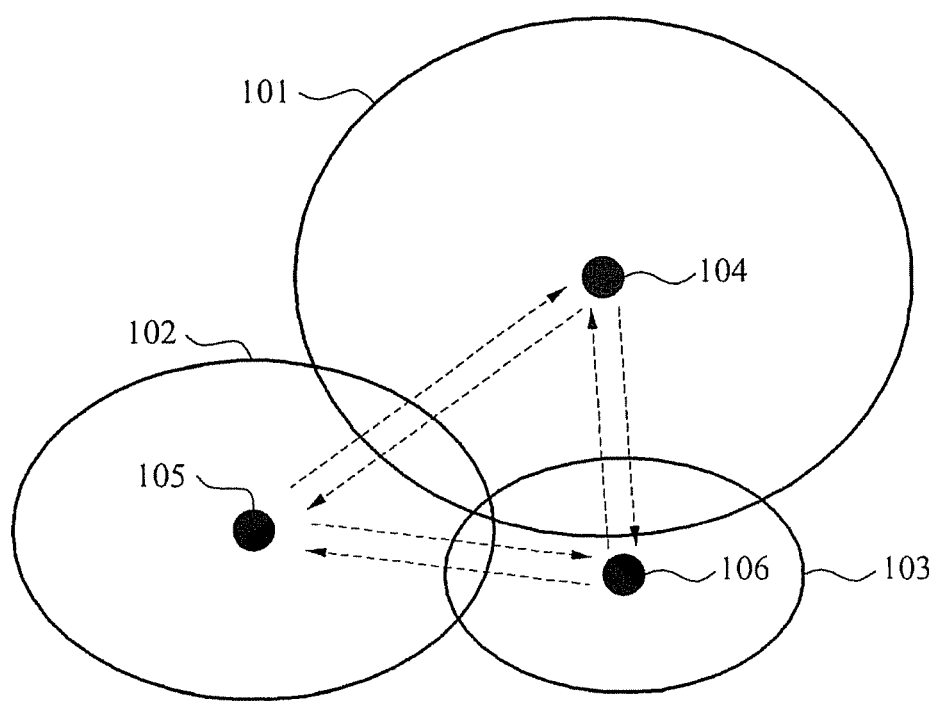
FIG. 1 illustrates a communication system to describe distribution of a utility function for a cell, according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to a mobile telecommunication system that may simultaneously transmit/receive data to/from a plurality of cells. In particular, a system and method is provided to manage distributed radio resources between cells based on a traffic load and to perform a joint group handover between neighbor cells using a multiple-connection system, such as a multiple-radio platform, a multiple antenna scheme, a directional beamforming scheme, or a MIMO scheme. When a relay or base station uses a modulation and coding scheme (MCS), the relay should consider the relay's own traffic load and determine a plurality of multiple superordinate stations or cell groups, and determine an amount of resources to be allocated based on either a selected cell or an amount of the traffic load to be allocated to a selected cell. The multiple-connection system may be defined as either a system simultaneously using a resource from a plurality of cells or a system simultaneously having multiple connections to a plurality of superordinate stations in the case of a relay, a plurality of access stations in the case of a mobile station, or a plurality of neighbor base stations in the case of a base station. The cell may be defined as a base station capable of relaying, a relay station, and a service environment of a mobile station.

First, an algorithm to determine a plurality of superordinate station groups (hereinafter, a critical set) to distribute traffic load and effective resource management method when a relay station (RS) is a multiple-connection system is described. Initially, a utility function as a load factor is described based on a traffic load. Each cell estimates the utility function value 'U' and regularly or periodically notifies a neighbor cell of the estimated utility function value 'U'. The utility function may be calculated as shown in Equation 1.

$$U_i = \frac{D_i}{C_i}, \quad \text{[Equation 1]}$$

where 'Ui' is a utility function of cell 'i', 'Di' is total demand of the cell 'i', and 'Ci' is total capacity of the cell 'i'. 'Ui' may alternatively be expressed as a ratio of total power to maximum power of the cell 'i'.

Each cell may obtain a maximum value, 'Umax', and a minimum value, 'Umin', of the utility function through the utility function value 'U' received from a neighbor cell as shown in Equation 2.

$$U_{max} = \max_{\forall j \in K_i} \{U_i, U_j\} \quad \text{[Equation 2]}$$

$$U_{min} = \min_{\forall i \in K_i} \{U_i, U_j\},$$

where 'K i' indicates a group of neighbor cells of the cell 'i'.

FIG. 1 shows a communication system to describe distribution of a utility function for a cell. A first base station 104, a second base station 105, and a third base station 106 included in three cells 101, 102, and 103, respectively, estimates their utility function value, 'U1', 'U2', and 'U3', and notifies a neighbor cell of the estimated utility function value, where it is assumed that the size of the value is in an order of 'U1'>'U2'>'U3'. In FIG. 1, the first base station 104 is a station having the greatest utility function and the third base station 106 is a station having the smallest utility function, where the determining of the critical set and resource allocation are performed by a resource reallocation trigger. For example, when the 'Umin' to 'Umax' ratio is smaller than 'r' ($0<r\leq 1$), the first base station 104 which corresponds to 'Umax' performs the determining of the critical set for resource allocation. This relationship need not be present in all aspects of the present invention.

Figure 2:
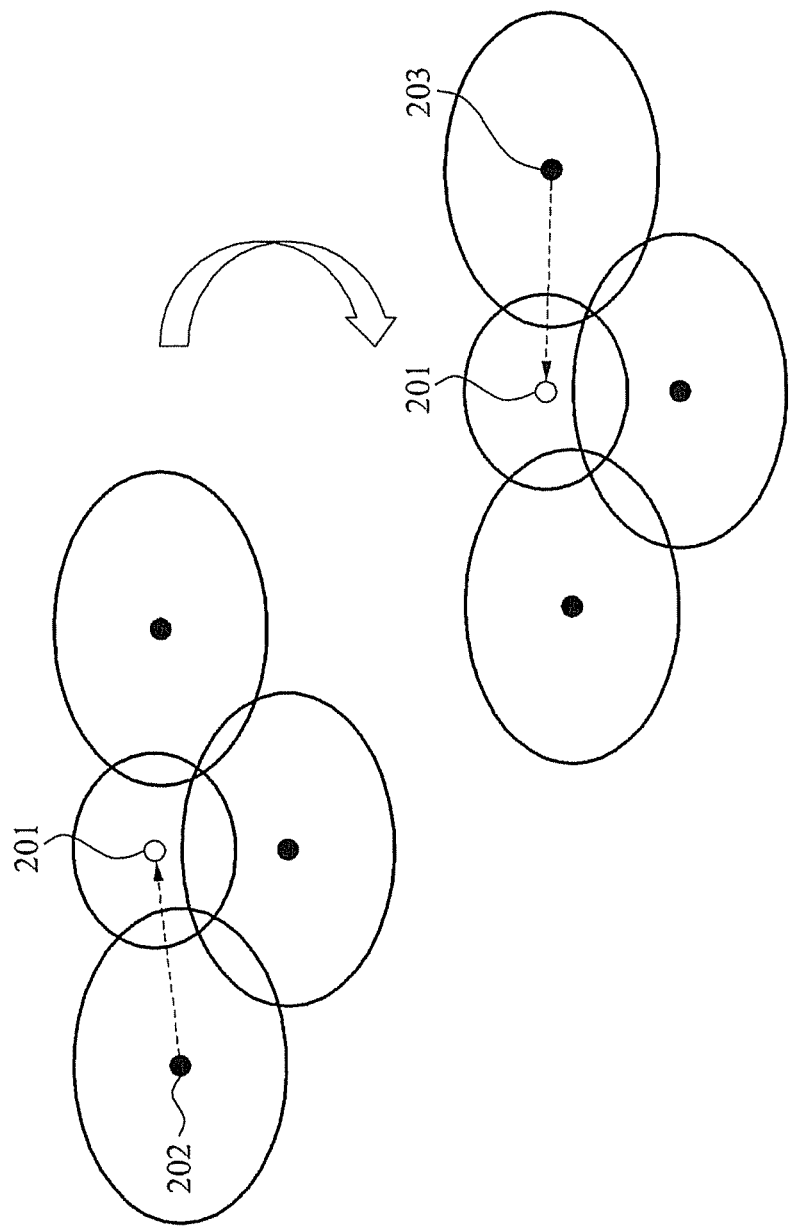
FIG. 2 illustrates a relay system having a single superordinate station.

FIG. 2 is an example of a relay system having a single-superordinate station. In FIG. 2, a relay station 201, which is a single-connection system, obtains a resource allocated from a first superordinate station 202. In this case, when the resource of the first superordinate station 202 is insufficient due to an increased traffic demand of a relay station 201, the relay station 201 performs a handover to a second superordinate station 203 having a relatively lower traffic load, thereby changing the topology of the relay system. However, when the second superordinate station 203 also has difficulty in handling traffic demand, topology reconfiguration fails. If the relay station 201 is a multiple-connection system, a needed radio resource may be allocated from a plurality of base stations or another relay station.

Figure 3:
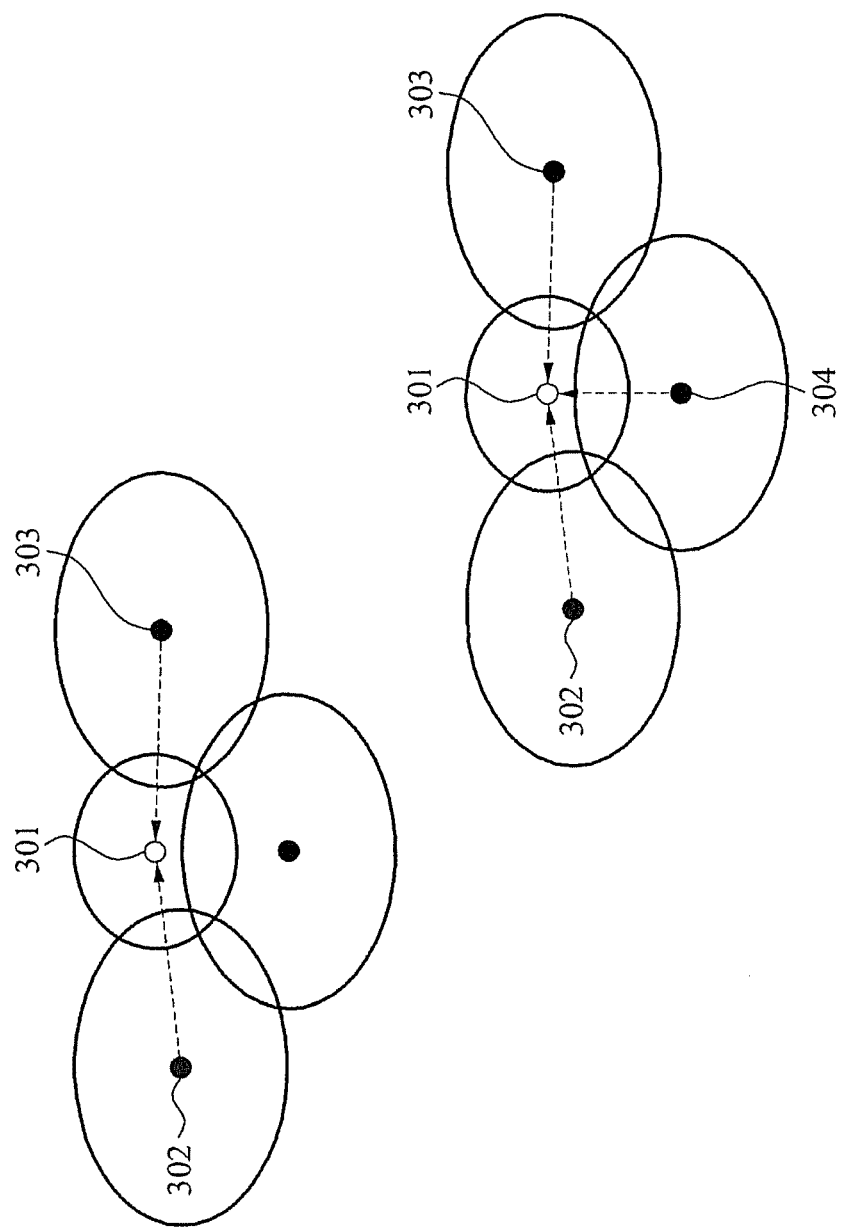
FIG. 3 illustrates a multiple-connection system having multiple superordinate stations, according to an embodiment of the present invention.

FIG. 3 shows a multiple-connection system having a multiple-superordinate station according to an embodiment of the present invention. A relay station 301, which is both a multiple-connection system and a critical mode 2 as shown in FIG. 2, simultaneously connects to both a first base station 302 and a second base station 303, and obtains a needed radio resource. The critical mode n indicates that a resource is allocated from n cells. It may also indicate that data is simultaneously transmitted/received to/from n number of cells. When neither the first base station 302 nor the second base station 303 have sufficient capacity for traffic demand (or Quality of Service (QoS)) of the relay station 301, the relay station 301 may verify feasibility of a critical mode 3 that uses a resource of the first base station 302, the second base station 303 and the third base station 304.

A process to determine a critical mode for satisfying the traffic demand (or QoS) and a critical set and a method of joint resource allocation with a selected cell according to an embodiment of the invention is described below. Each cell estimates a utility function, 'U', and notifies a neighbor cell of the estimated utility function. Each cell may receive a 'U' value of the neighbor cell and arrange the 'U' value including the cell's own 'U' value. For example, a corresponding cell may align 'U' values in ascending order as given in Equation 3.

$$U=\{U0,U1,U2,\ldots,Umax\} \text{ where } U0<U1< \\ U2<\ldots<Umax, U0=Umin. \quad \text{[Equation 3]}$$

'N' is a number of factors comprising the critical set. Un<Uavg is applied to each 'N', and 'M' being equal to 'N+1' indicates a maximum critical mode. 'M' may have a value greater than 1.

'Uavg,n' may indicate an average of utility function in a critical mode n. For example, the 'Uavg,n' may be expressed as Equation 4.

$$U_{avg,n} = \frac{\sum_{t=0}^{n-2} U_t + U_{max}}{n} \quad \text{[Equation 4]}$$

'Pi' indicates a utility price matrix in a critical mode n. For example, the 'Pn' may be expressed as Equation 5.

$$Pn=[P0n\ P1n\ \ldots\ P(n-2)n]T \quad \text{[Equation 5]}$$

'Ptn' indicates a utility price of a candidate cell in a critical mode n. For example, the 'Ptn' may be expressed as Equation 6, wherein the candidate cell may include a cell corresponding to the critical set.

$$Ptn = Uavg, n - Ut \quad \text{[Equation 6]}$$

The utility price may indicate a normalized resource allocation which is a factor of the critical set. For example, the utility price may be expressed as Equation 7.

$$\Sigma t\, Ptn = Pmax, n = Umax - Uavg, n \quad \text{[Equation 7]}$$

A resource corresponds to a utility price 'Pmax,n'(Umax−Uavg,n) provided by a base station having a maximum value 'Umax'. Finally, as given in Equation 8, both a station being a factor of a critical set and a utility function value of the base station are converted to 'Uavg,n'

$$Umax - (Umax - Uavg, n) = Ut + Ptn,$$
for all $t = Ut + Uavg, n - Ut$, for all $t = Uavg, n$, for all $n$ [Equation 8]

The above-described process may be performed by a telecommunication system such as a base station having the 'Umax'. In this case, the process comprises searching the critical set and allocating a resource needed by the critical set.

The critical set may indicate a group of infra-stations allocating a resource to a multiple-connection system to satisfy a load balancing amount. The process of determining the critical set may be a resource discovery method. For example, considering a centralized scheduling in a multi-hop relay network, an initial critical mode is a critical mode 2 in a group 'U' aligned in ascending order, and the critical mode 2 determines a single cell to distribute a load. In this case, a base station corresponding to 'Umax' (hereinafter, BS(Umax)) may determine a factor(BS(U0)) having 'Umin(=U0)' as a candidate critical set 'C2'. For example, the critical set 'C2' mode 2 may be expressed as Equation 9.

$$C2 = \{BS(U0)\} \quad \text{[Equation 9]}$$

In addition, the BS(Umax) may select a relay station to be used as a multiple-connection system (for example, a relay having the greatest traffic load, hereinafter RSa) among the subordinate relay stations of the base station BS(Umax). Both the determined critical set 'C2' and the BS(Umax), which is a current station, are simultaneously able to service the RSa in the critical mode 2, wherein the RSa may be one of the subordinate relay systems of BS(Umax).

In order to distribute traffic load, Uavg,2 for the critical mode 2 is calculated and then a utility price matrix P2 for the critical mode 2 is obtained. In other words, a normalized traffic load Pt2($t=0$) to be allocated to the selected critical set(BS(U0)) is calculated. A resource corresponding to Pt2 provided by the BS(Umax) is allocated from the BS(U0). In order to achieve this, feasibility of Pt2 is verified in a BS(U0), and upon receiving an acceptance message from the BS(U0), the RSa is connected to the BS(U0). Therefore, the RSa simultaneously obtains resources allocated from the both BS(Umax) and BS(U0). If an acceptance message is not received from the BS(U0) determined in the critical mode 2, a critical mode 3 is checked. The critical mode 3 has two element stations to distribute the load, and a station corresponding to 'U1' is additionally determined. For example, the critical set may be expressed as Equation 10.

$$C3 = \{BS(U0), BS(U1)\} \quad \text{[Equation 10]}$$

In this case, the BS(Umax) once again calculates Uavg,3 based on the critical mode 3, and also calculates a utility price matrix P3, namely, Pt3($t=0,1$), which is the value to be distributed to each factor in the critical set C3. Thereafter, the element stations and feasibility are verified. The critical mode 3 may operate only when the BS(Umax) receives acceptance messages from all of the element stations.

In this process, when a base station corresponding to 'Umax' determines a critical set for distributing traffic load, the base station determines a base station corresponding to 'Umin' as a first element station of the critical set, and additionally adds a element station until feasibility is guaranteed, starting from the one element station included in a cell having a small utility function. All the element stations guarantee the feasibility, and the number of element stations plus one may be the number of optimized critical modes. The critical set in a critical mode n may be expressed as Equation 11.

$$Cn = \{BS(U0), BS(U1), \ldots, BS(Un-2)\} \quad \text{[Equation 11]}$$

Figure 4:
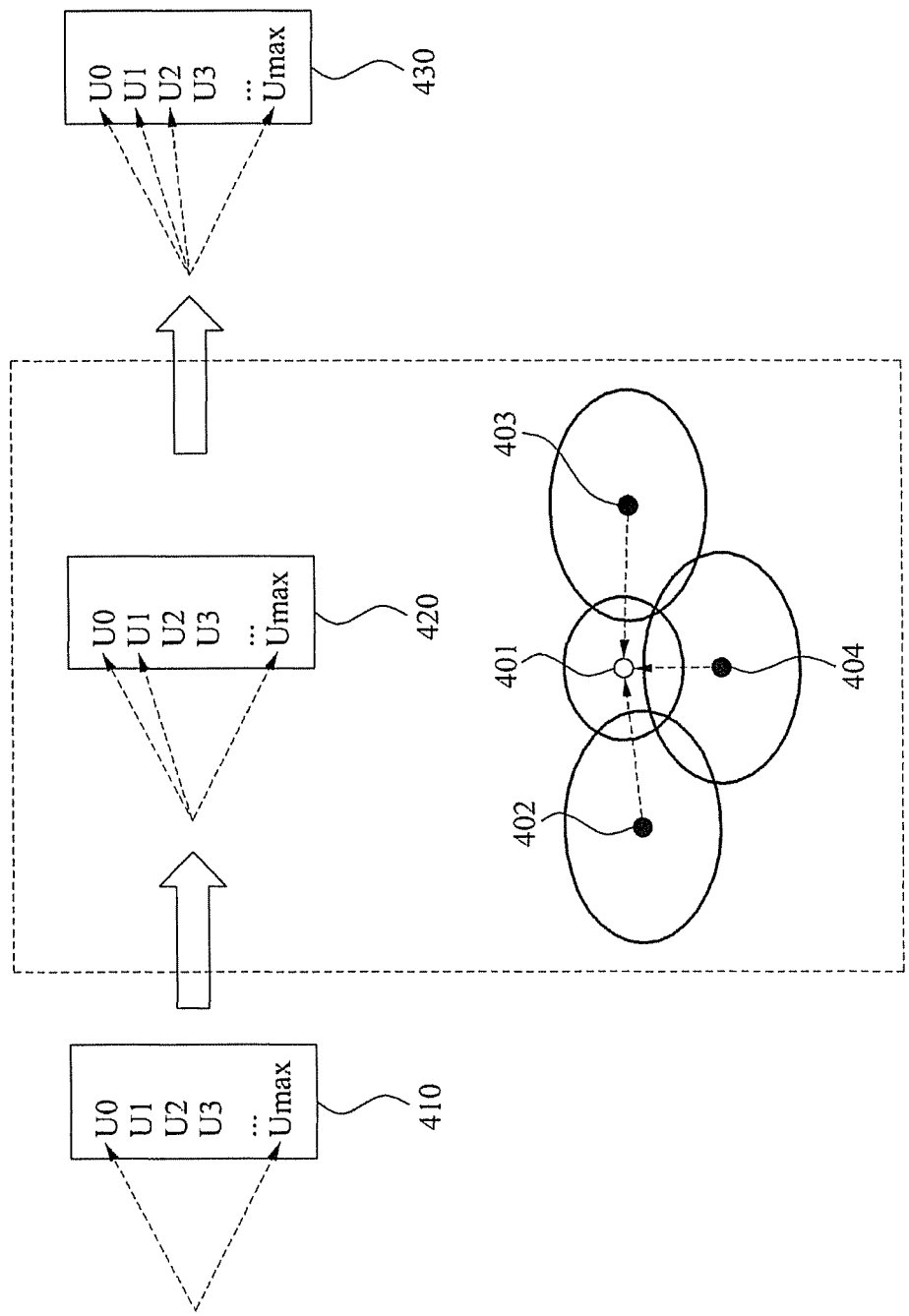
FIG. 4 illustrates determining a critical mode and a critical set of a relay station which supports multiple-connection, according to an embodiment of the present invention.

FIG. 4 shows determining a critical mode and a critical set of a relay station which supports a multiple-connection. A base station corresponding to 'Umax' may determine a base station corresponding to 'U0(=Umin)' as an element station of a critical set. A relay station verifies feasibility after obtaining P02 corresponding to a critical mode 2 410 and, if feasibility exists, the relay station operates as a relay station of the critical mode 2 410. However, if the critical mode 2 410 is not accepted, the relay station verifies feasibility corresponding to a critical mode 3 420, and a base station corresponding to 'U1' is additionally determined. In this case, 'U1' is included in the critical set. Dotted arrows, as shown in FIG. 4, indicate utility functions included in the critical set corresponding to each critical mode. In order for a relay station 401 to operate as a relay station of critical mode 3 420 as shown in FIG. 4 corresponding to the critical mode 3 420, the relay station 401 should obtain Pt3(P03, P13) from a first base station 402 and verify feasibility of each element station, a second base station 403 and a third base station 404. If feasibility is determined to exist, the relay station 401 operates as a relay station of the critical mode 3 420. However, if the critical mode 3 420 is also not accepted, the critical mode 3 420 is changed to a critical mode 4 430. The change of critical modes occurs repeatedly until the critical mode reaches a maximum critical mode.

Figure 5:
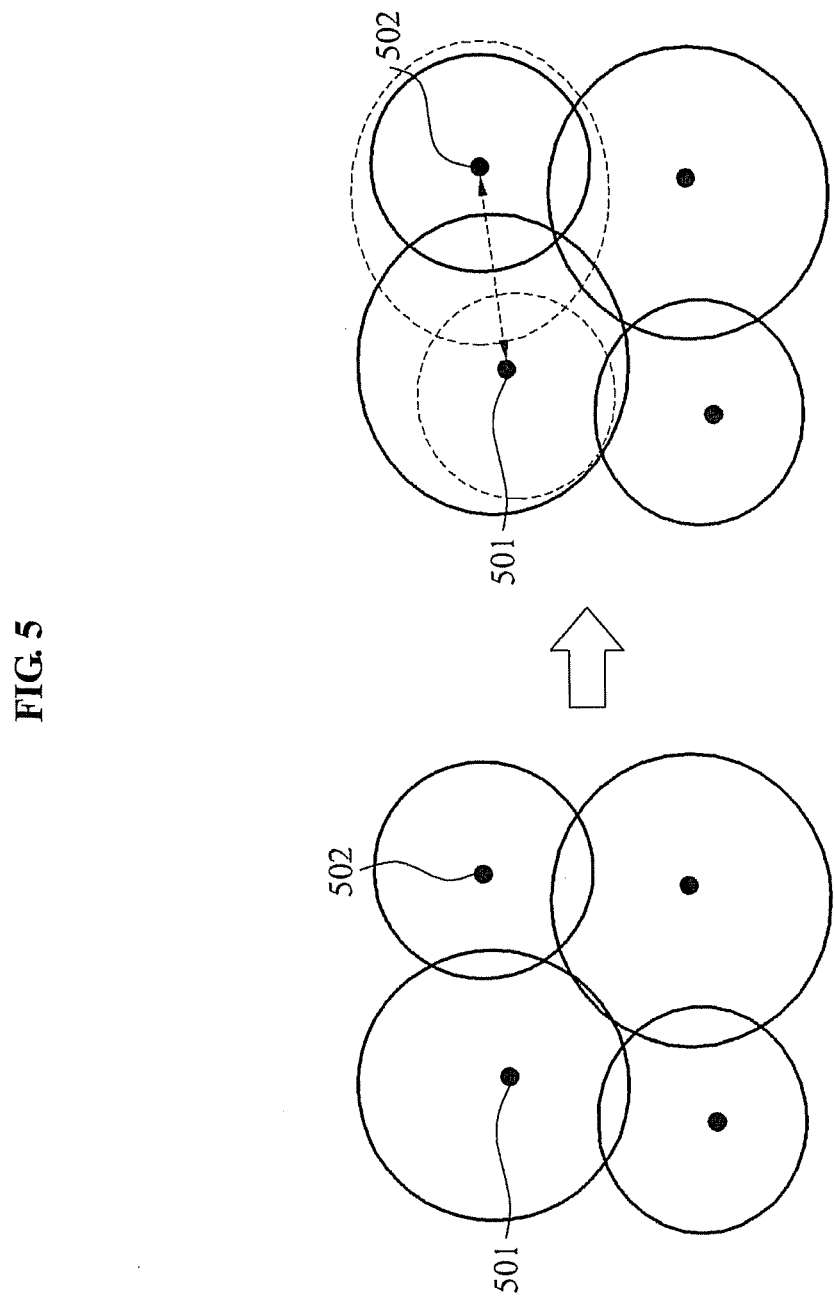
FIG. 5 illustrates an example of a handover to a target station, according to an embodiment of the present invention.
Figure 6:
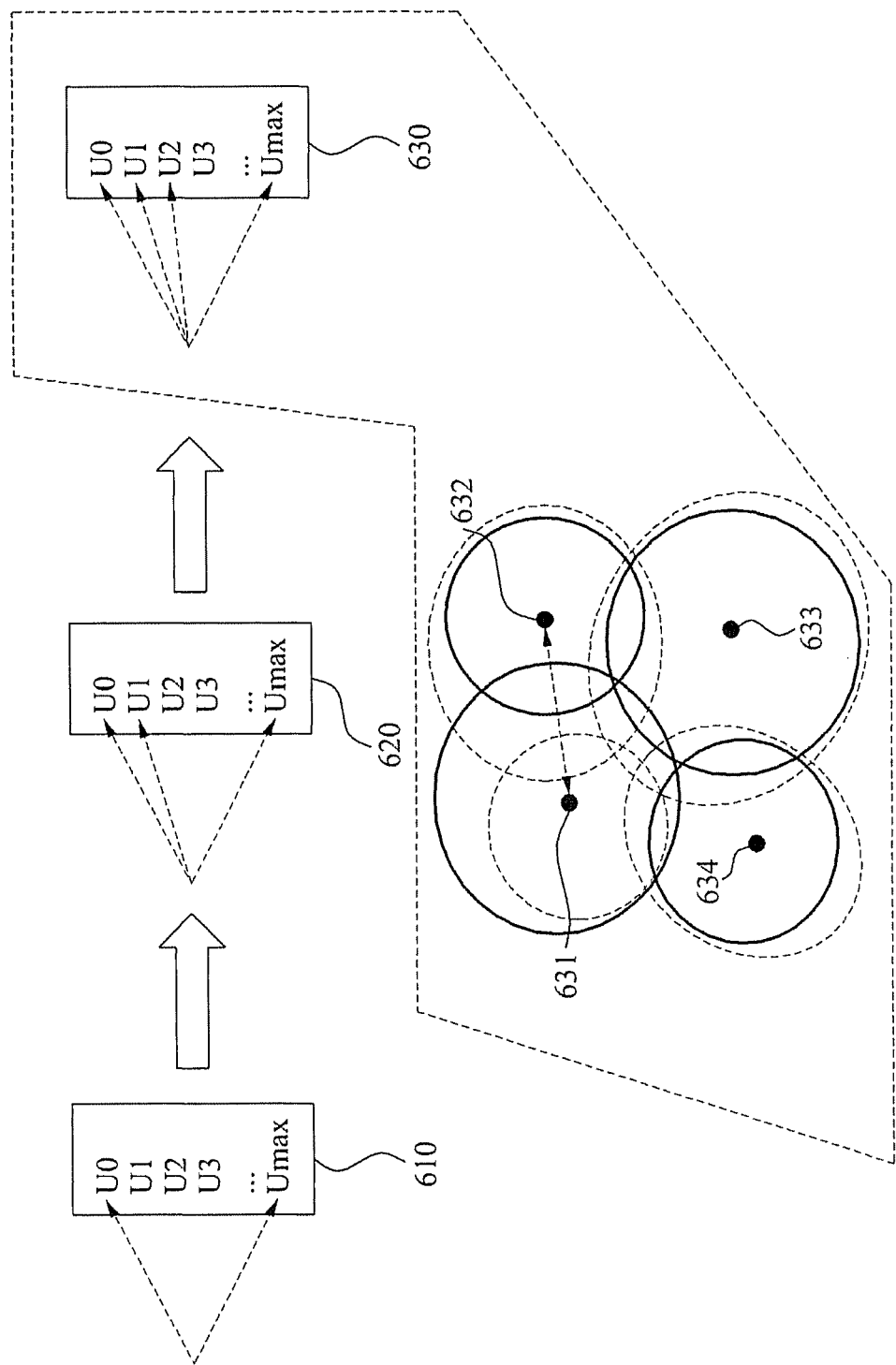
FIG. 6 illustrates an example of joint group handover for a multi-cell, according to an embodiment of the present invention.

The concept of the critical set can be applied to a process determining a multi-target station and joint group handover when performing a group handover of mobile stations. FIG. 5 shows an example of a handover to a target station according to an embodiment of the present invention. In order to perform a handover, a first base station having 'Umax' is selected, and a group of mobile stations in a second base station 502, each of which has a traffic load corresponding to 'P', is selected as target stations. However, if negotiation with the first base station 501 fails to proceed with the handover due to lack of resources, a plurality of target cells (critical set) are determined and the group of the mobile stations corresponding to 'P' are divided into a plurality of subsets, thereby performing a handover. FIG. 6 is an example of joint group handover for a multiple-cell. When a critical mode 2 610 is not accepted, the critical mode 2 610 may be changed to the critical mode 3 620, and when the critical mode 3 620 is also not accepted, the critical mode 3 620 may be changed to the critical mode 4 630. In this case, a first base station 631 corresponding to 'Umax' may determine a second base station 632, a third base station 633, and a fourth base station 634 for distributing traffic load, and may change beam patterns to service a portion of traffic of the first base station 631.

Figure 7:
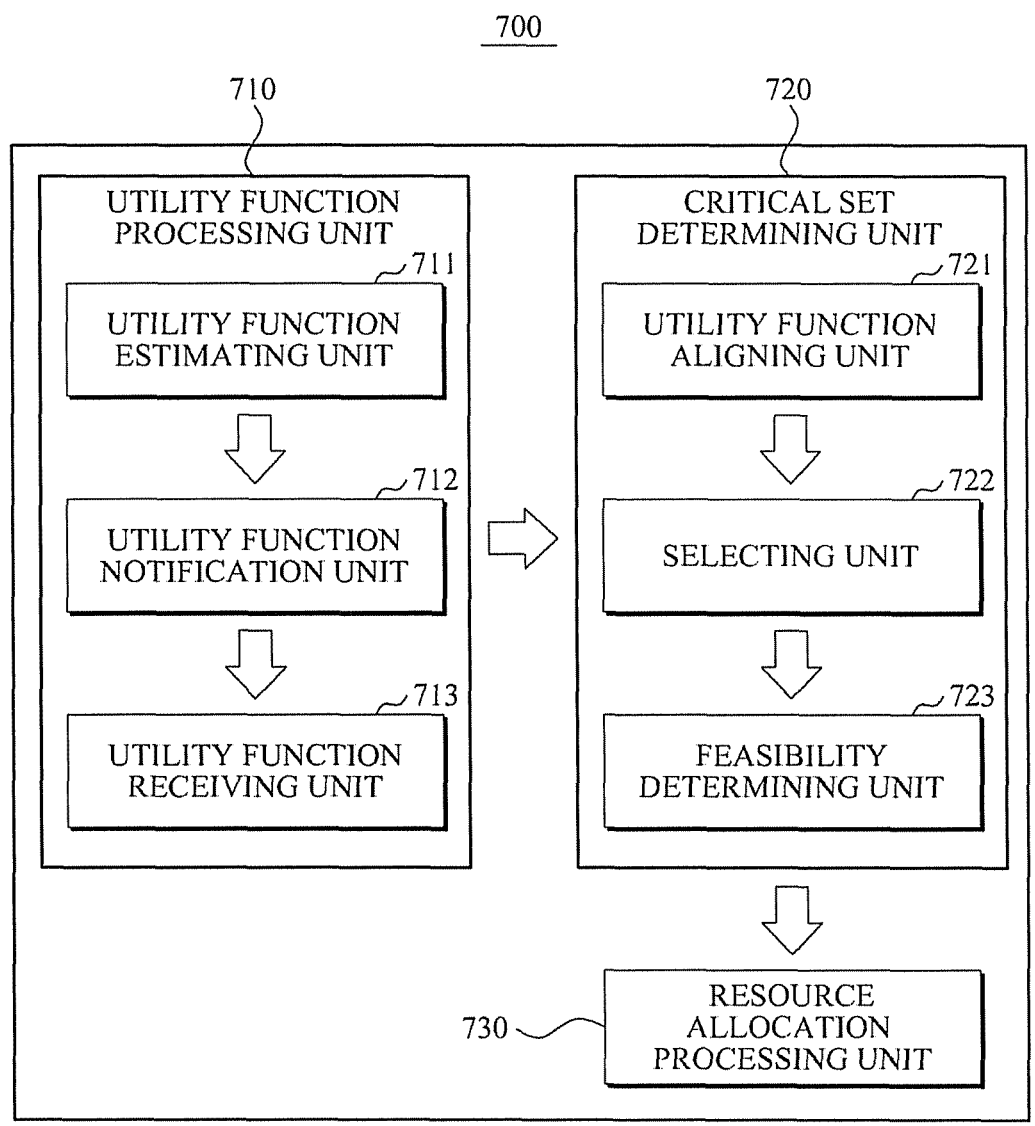
FIG. 7 illustrates internal configurations of a mobile telecommunication system, according to an embodiment of the present invention.

FIG. 7 shows internal configurations of a mobile telecommunication system 700 according to an embodiment of the invention. The mobile telecommunication system 700 comprises a utility function processing unit 710, a critical set determining unit 720, and resource allocation processing unit 730. According to other aspects of the present invention, the mobile telecommunication system may include additional and/or different units. Similarly, the functionality of two or more of the above units may be integrated into a single component. The units of the mobile telecommunication system 700 may be incorporated into, for example, a base station or a mobile device.

The utility function processing unit 710 processes a utility function, which is a load factor of each cell, where the utility function may include either total demand to total capacity ratio of a cell or total power to maximum power ratio of a cell. To process the utility function, the utility function processing unit 710 may include a utility function estimating unit 711 to estimate a utility function of a corresponding cell, a utility function notification unit 712 to notify a neighbor cell of the estimated utility function, and a utility function receiving unit 713 to receive a utility function of the neighbor cell.

The critical set determining unit 720 determines a critical set based on the utility function. The critical set determining unit may comprise a utility function aligning unit 721 to align the utility function, a selecting unit 722 to select another at least one telecommunication system corresponding to a predetermined utility function when the utility function of the corresponding cell is the same as the maximum value of the aligned utility function, and a feasibility determining unit 723 to determine whether a feasibility of the other at least one mobile telecommunication system exists. The selecting unit 722 may select n−1 other mobile telecommunication systems in the order of the utility functions aligned based on a predetermined critical mode n. For example, the predetermined critical mode n may start at 2 and increase. The predetermined critical mode n may start at 2 and increase according to verification of the existence of a feasibility of the other at least one mobile telecommunication system. The selecting unit 722 in the critical mode 2 may select another mobile telecommunication system. The feasibility determining unit 723 may also determine that a feasibility exists when a corresponding utility price is transmitted to the other telecommunication system and an acceptance message for the utility price is received from the selected other telecommunication systems. In this instance, the utility price may indicate normalized resource allocation needed by an element station of the critical set. The feasibility determining unit 723 may calculate the utility price corresponding to the other mobile telecommunication system, transmit the utility price to the corresponding other mobile telecommunication system, and determine a feasibility upon receiving an acceptance message from the utility price.

When the mobile telecommunication system 700 is a system selected by another mobile telecommunication system, the mobile telecommunication system 700 may further comprise a utility price receiving unit (not shown) to receive a utility price from the other mobile telecommunication system, a feasibility determining unit to determine whether a feasibility of a corresponding multiple-connection system exists based on the utility price (not shown), and a transmitting unit (not shown) to transmit an acceptance message to the other mobile telecommunication system.

The resource allocation processing unit 730 allocates a resource in association with another at least one mobile telecommunication system corresponding to the critical set, where the resource allocation processing unit 730 may transmit a predetermined message based on the utility function to the other at least one mobile telecommunication system when the utility function of the corresponding cell is equal to the maximum value of the aligned utility function. Conversely, when a utility function corresponding to the mobile telecommunication system 700 is less than or equal to the maximum value and the resource allocation processing unit 730 receives the predetermined message, the resource allocation unit 730 determines the number of hops to a multiple-connection system selected based on traffic characteristic information included in a multiple-connection system to which a resource is to be allocated and beamforms using the multiple-connection system based on the determined number of hops.

Figure 8:
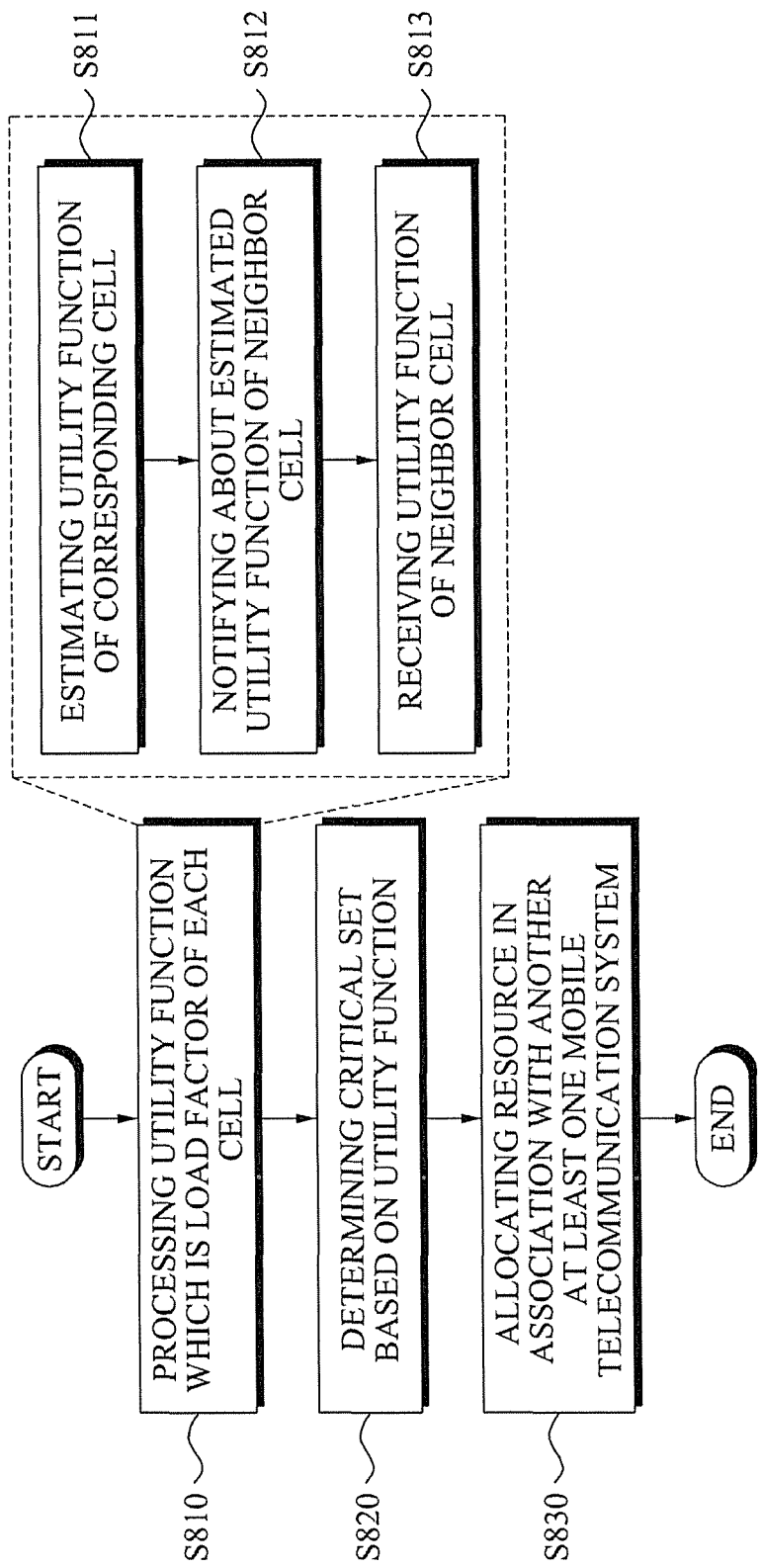
FIG. 8 is a flowchart of a joint resource allocation process according to an embodiment of the invention.

FIG. 8 is a flowchart of a process of joint resource allocation according to an embodiment of the invention. The mobile telecommunication system processes a utility function which is a load factor of each cell in operation S810, where the utility function may include either total demand to total capacity ratio of a cell or total power to maximum power ratio of a cell. To process the utility function, operation S810 may include estimating a utility function of a corresponding cell in operation S811, notification of the estimated utility function of a neighbor cell in operation S812 and receiving a utility function of the neighbor cell in operation S813. In operation S820, the mobile telecommunication system determines a critical set based on the utility function. The determining of the critical set based on the utility function is described in detail with respect to FIG. 9.

In operation S830, the mobile telecommunication system allocates a resource in association with another at least one mobile telecommunication system corresponding to the critical set, where the mobile telecommunication system may transmit a predetermined message based on the utility function when the utility function of the corresponding cell is equal to the maximum value of the aligned utility function. Conversely, when a utility function corresponding to the mobile telecommunication system is less than or equal to the maximum value and the mobile telecommunication system receives a predetermined message, the mobile telecommunication system determines the number of hops to a multiple-connection system selected based on traffic characteristic information included in a multiple-connection system to which a resource is to be allocated and beamforms using the multiple-connection system based on the determined number of hops.

For example, the mobile telecommunication system determines the existence of feasibility of other at least one mobile telecommunication system included in a critical set, the critical mode starting at 2. In this case, a base station in the mobile telecommunication system is corresponding to utility function 'Umax', the mobile telecommunication system determines a critical mode of its subordinate relay station, and a group of the other at least one mobile telecommunication systems, which are a critical set to distribute load. The mobile telecommunication system in the critical mode 2 determines feasibility 'P02' of another at least one mobile telecommunication system corresponding to 'U0(=Umin)'. The mobile telecommunication system searches for the 'P02' that is suitable to distribute the traffic load between the other at least one mobile telecommunication systems, and determines whether allocating a resource is feasible. When the mobile telecommunication system receives an acceptance message from the other at least one mobile telecommunication system, the mobile telecommunication system transmits a predetermined message such as 'MODE-RED msg' and the multiple-connection system operates as a system of critical mode 2.

However, if the mobile telecommunication system fails to receive the acceptance message, another at least one mobile telecommunication system corresponding to the critical set 'U1' is added to the critical set and a critical mode 3 is determined. In the critical mode 3, the mobile telecommunication obtains 'P03' and 'P13', respectively corresponding to 'BS(U0)' and 'BS(U1)' described above as an element station, and verifies feasibility thereof. In the same manner, a multiple-connection system may operate as a system of critical mode 3 only when the mobile communication system receives acceptance messages from all element stations.

Figure 9:
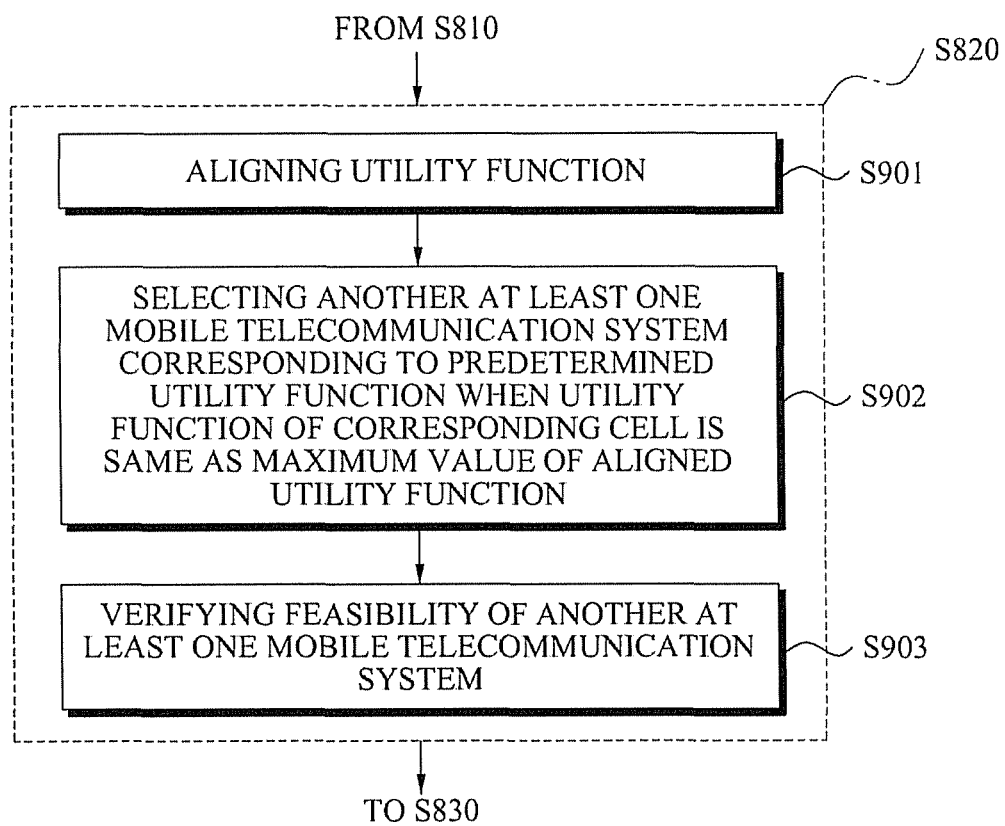
FIG. 9 is a flowchart of a process to determine a critical set according to an embodiment of the invention.

FIG. 9 is a flowchart of a process of determining a critical set according to an embodiment of the invention. As shown in FIG. 9, operations S901 to S903 may be included in operation S820 described with respect to FIG. 8. The mobile telecommunication system aligns the utility function in operation S901, and the mobile telecommunication system selects another at least one mobile telecommunication system corresponding to a predetermined utility function in operation S902, when the utility function of the corresponding cell is the same as the maximum value of the aligned utility function. The mobile telecommunication system verifies feasibility of the other mobile telecommunication system in operation S903. The mobile telecommunication system may select n−1 other at least one mobile telecommunication systems in the order of the utility functions aligned based on a predetermined critical mode n. For example, the predetermined critical mode n may start at 2 and increase according to verification of existence of feasibility of the other at least one mobile telecommunication system. In critical mode 2, the mobile telecommunication system may select at least one mobile telecommunication system. The mobile telecommunication system may determine that feasibility exists when a corresponding utility price is transmitted to the other telecommunication system and an acceptance message for the utility price is received from the selected other telecommunication systems.

The utility price may indicate normalized resource allocation needed by an element station of the critical set. A mobile station of the mobile telecommunication system may calculate the utility price of the corresponding other mobile telecommunication system, transmit to the corresponding other mobile telecommunication system, and determine a feasibility upon receiving an acceptance message from the utility price. Conversely, when the mobile telecommunication system is a system selected by another mobile telecommunication system, the mobile telecommunication system receives a utility price from the other mobile telecommunication system, verifies a feasibility of a corresponding multiple-connection system, and upon determining that the feasibility exists, transmits an acceptance message to the other mobile telecommunication system.

The mobile telecommunication system may also use a process for determining a critical set for collaborative handover in performing a group handover in general cellular environments, but not in a multi-hop relay network. This process is similar to the above mentioned process of determining a critical set, but has a difference in that a determined critical set is a multi-target station pool and performs the group handover. In this case, mobile stations corresponding to targets are mutually and exclusively handed over with respect to each element station, and when the mobile station is a multiple-connection system, a plurality of target stations are allocated to a single mobile station. As described above, determining a proper critical mode and critical set for joint group handover based on neighbor cells improves handover success rate and efficient load allocation promptly distributes load.

According to the mobile telecommunication system and a method of joint resource allocation according to aspects of the invention, it is possible to determine a critical mode and a critical set for distributing load in a mobile telecommunication system including a multiple-connection function and operate joint resource allocation to each element station for performing radio resource management, QoS-aware multiple-session management, handover success rate improvement, and call blocking rate reduction in the mobile telecommunication system. Also, operating joint resource allocation and group handover in association with a multi-cell selected based on traffic load of each cell improves regional collision and asymmetric load phenomenon between cells.

The method of joint resource allocation for performing radio resource management according to aspects of the invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A mobile telecommunication system, comprising:
a utility function processing unit configured to process a utility function that is a load factor of each cell;
a critical set determining unit configured to determine a critical set corresponding to at least one other mobile telecommunication system based on the utility function and a feasibility of the at least one other mobile telecommunication system; and
a resource allocation processing unit configured to allocate a resource in association with the at least one other mobile telecommunication system,
wherein the critical set determining unit comprises a feasibility determining unit configured to
calculate a utility price corresponding to the at least one other mobile telecommunication system,
transmit the utility price to the at least one other mobile telecommunication system, and
determine that the feasibility exists upon receiving, from the at least one other mobile telecommunication system, an acceptance message for the utility price.

2. The mobile telecommunication system according to claim 1, wherein the utility function comprises either a total demand to total capacity ratio of a cell or a total power to maximum power ratio of a cell.

3. The mobile telecommunication system according to claim 1, wherein the utility function processing unit comprises:
a utility function estimating unit configured to estimate a utility function of a corresponding cell;
a utility function notification unit configured to notify a neighbor cell of the estimated utility function; and
a utility function receiving unit configured to receive a utility function of the neighbor cell.

4. The mobile telecommunication system according to claim 1, wherein the resource allocation processing unit is further configured to transmit a predetermined message based on the utility function to the at least one other mobile telecommunication system.

5. The mobile telecommunication system according to claim 1, wherein the resource allocation processing unit is further configured to:
determine a number of hops to a multiple-connection system selected based on traffic characteristic information of the multiple-connection system to which a resource is to be allocated; and
beamform using the multiple-connection system based on the determined number of hops.

6. The mobile telecommunication system according to claim 1, wherein the at least one other mobile telecommunication system:
determines whether the feasibility exists based on the utility price; and
transmits the acceptance message to the mobile telecommunication system when the feasibility exists.

7. A mobile telecommunication system, comprising:
a utility function processing unit configured to process a utility function that is a load factor of each cell;
a critical set determining unit to configured determine a critical set corresponding to at least one other mobile telecommunication system based on the utility function; and
a resource allocation processing unit configured to allocate a resource in association with the at least one other mobile telecommunication system,
wherein the critical set determining unit comprises
a utility function aligning unit configured to align the utility function,
a selecting unit configured to select the at least one other mobile telecommunication system corresponding to a predetermined utility function when a utility function of a corresponding cell of the mobile telecommunication system is the same as a maximum value of the aligned utility function, and
a feasibility determining unit configured to determine whether a feasibility of the at least one other mobile telecommunication system exists.

8. The mobile telecommunication according to claim 7, wherein the selecting unit is further configured to select n−1 other mobile telecommunication systems in an order of the utility function aligned based on a predetermined critical mode n.

9. The mobile telecommunication system according to claim 8, wherein the predetermined critical mode n starts at 2 and increases.

10. The mobile telecommunication system according to claim 7, wherein the feasibility determining unit is further configured to determine that the feasibility exists when a corresponding utility price is transmitted to the at least other one mobile telecommunication system and an acceptance message for the utility price is received from the selected at least one other mobile telecommunication system.

11. The mobile telecommunication system according to claim 10, wherein the utility price indicates a normalized resource allocation needed by an element station of the critical set.

12. A mobile telecommunication system, comprising:
a utility function processing unit configured to process a utility function that is a load factor of each cell;
a critical set determining unit configured to determine a critical set corresponding to at least one other mobile telecommunication system based on the utility function and a feasibility of the at least one other mobile telecommunication system;
a resource allocation processing unit configured to allocate a resource in association with the at least one other mobile telecommunication system;
a utility price receiving unit configured to receive a utility price from the at least one other mobile telecommunication system;
a feasibility determining unit configured to determine whether a feasibility of a corresponding multiple-connection system exists based on the utility price; and
an acceptance message transmitting unit configured to transmit an acceptance message to the at least one other mobile telecommunication system when the feasibility determining unit determines that the feasibility of the corresponding multiple-connection system exists.

13. A method of joint resource allocation, the method comprising:
processing a utility function that is a load factor of each cell;
determining a critical set corresponding to at least one other mobile telecommunication system based on the utility function and a feasibility of the at least one other mobile telecommunication system;
allocating a resource in association with the at least one other mobile telecommunication system
calculating a utility price corresponding to the at least one other mobile telecommunication system;
transmitting the utility price to the at least one other mobile telecommunication system; and
determining that the feasibility exists upon receiving, from the at least one other mobile telecommunication system, an acceptance message for the utility price.

14. The method of joint resource allocation according to claim 13, wherein the utility function comprises either a total demand to total capacity ratio of a cell or a total power to maximum power ratio of a cell.

15. The method of joint resource allocation according to claim 13, wherein the processing of the utility function comprises:
estimating a utility function of a corresponding cell;
notifying a neighbor cell of the estimated utility function; and
receiving a utility function of the neighbor cell.

16. The method of joint resource allocation according to claim 13 wherein the allocating of the resource comprises:
transmitting a predetermined message based on the utility function to the at least one other mobile telecommunication system.

17. The method of joint resource allocation according to claim 13, wherein the allocating of the resource comprises:
determining a number of hops to a multiple-connection system selected based on traffic characteristic information of the multiple-connection system to which a resource is to be allocated; and beamforming using the multiple-connection system based on the determined number of hops.

18. A computer-readable recording medium storing a program to implement the method of claim 13.

19. A method of joint resource allocation, the method comprising:

processing a utility function that is a load factor of each cell;

determining a critical set corresponding to at least one other mobile telecommunication system based on the utility function; and allocating a resource in association with the at least one other mobile telecommunication system, wherein the determining of the critical set comprises aligning the utility function;

selecting the at least one other mobile telecommunication system corresponding to a predetermined utility function when a utility function of a corresponding cell of a mobile telecommunication system is the same as a maximum value of the aligned utility function; and determining a feasibility of the at least one other mobile telecommunication system.

20. The method of joint resource allocation according to claim 19, wherein the selecting of the at least one other mobile telecommunication system comprises:

selecting n−1 other mobile telecommunication systems in an order of the utility function aligned based on a predetermined critical mode n.

21. The method of joint resource allocation according to claim 19, wherein the determining of the feasibility comprises:

transmitting a corresponding utility price to the at least one other mobile telecommunication system; and determining the feasibility upon receiving an acceptance message for the utility price from the selected at least one other mobile telecommunication systems.

* * * * *